Figure 1:
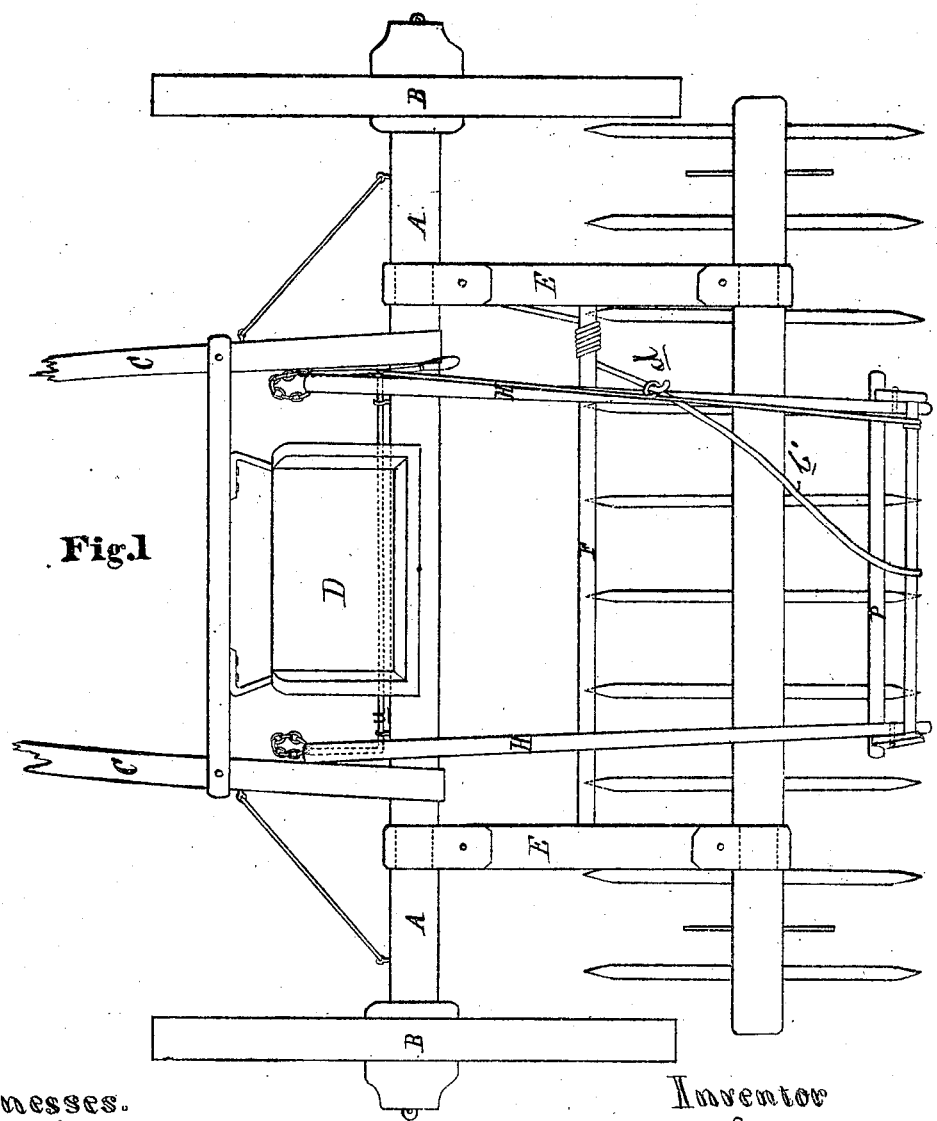

W. Squier,
Revolving Rake.

2 Sheets Sheet 1

No. 99,966.

Patented Feb 15, 1870.

Witnesses.
D. D. Kane.
E. W. Anderson.

Inventor
W. Squier
Chipman Hosmer & Co.
Attorneys

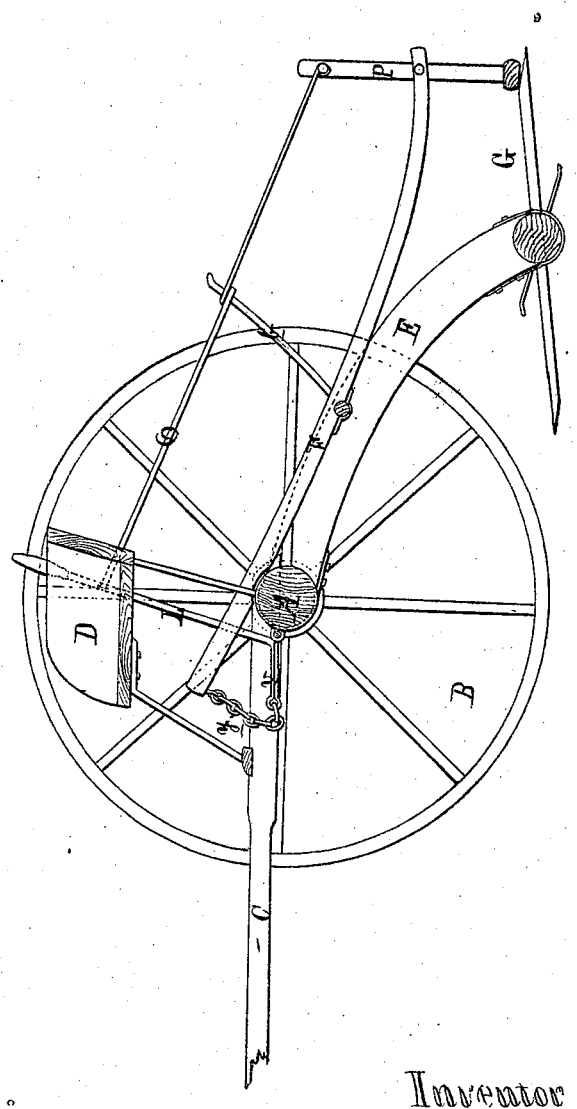

United States Patent Office.

WESLEY SQUIER, OF EDON, OHIO.

Letters Patent No. 99,966, dated February 15, 1870.

IMPROVEMENT IN HORSE-RAKE.

The Schedule referred to in these Letters Patent and making part of the same.

To all whom it may concern:

Be it known that I, WESLEY SQUIER, of Edon, in the county of Williams, and State of Ohio, have invented a new and valuable Improvement in Sulky Horse Hay-Rakes; and I do hereby declare that the following is a full, clear, and exact description of the construction and operation of the same, reference being had to the annexed drawings making a part of this specification and to the letters and figures of reference marked thereon.

Figure 1 of the drawings is a top view of my invention.

Figure 2 is a central vertical section of same.

My invention has relation to horse hay-rakes; and

It consists in the construction and novel arrangement of devices intended to serve as efficient means in raking hay by horse power.

A of the drawings represents the axle of my carriage;

B, the wheels;

C, the shafts; and

D, the driver's seat.

E E represent curved arms hinged to the axle, to the rear ends of which is hinged the revolving rake G.

F represents a cross-bar uniting the arms E E.

H H are arms, the front ends of which rest upon the axle. Their centers are attached to the cross-bar F, and their rear ends serve as means for supporting the trip-frame P, in the manner shown.

The letter $u$ represents an iron rod held in staples on the front side of the axle, and has each end bent forward, so as to form arms or levers, for the purpose mentioned hereafter.

These extended arms are marked $v$ on the drawings, and they are respectively united with the front ends of arms H H by means of the chains $y$.

To the right of the driver's seat, and having its bent lower end firmly united to the right-hand arm $v$, is arranged the operating lever L. It is held in place by a staple in the outer side of the right-hand arm H, and serves as a means for operating trip-frame P, as hereinafter mentioned.

O is a rod extending from the lever L to the top cross-piece of the trip-frame, and $b'$ is a brace-rod extending from the upper bar of the trip-frame to the rod O, and connected with the rod O in the manner represented on the drawings.

The letter $b$ represents a spring, the lower end of which is coiled around the cross-bar F, and the upper end secured in a loop formed in the rod O, as shown.

My horse-rake is operated as follows:

The lever L is left untouched until the rake is loaded. I then force the lever forward. This movement presses down the front ends of arms $v$, tightens the chains $y$, and lifts the rake and trip-frame. At the same time the rod O is drawn forward, and with it the upper part of the trip, thereby releasing the trip from the rake, and allowing the rake to revolve. The lever is now allowed to resume its original position, and the process is repeated indefinitely.

I make a coil in the rod O at the point $d$, which serves as a spring in regulating the movements of the lever.

Said spring will bring the lever to its original position, and render that part of the movements of the machine automatic.

What I claim as my invention, and desire to secure by Letters Patent, is—

The horse-rake herein described, having the rake G, lever L, arms $v$, chains $y$, arms H H, axle A, cross-bar F, and rod O, constructed and arranged to operate as specified.

In testimony that I claim the above, I have hereunto subscribed my name in the presence of two witnesses.

WESLEY SQUIER.

Witnesses:
 JAMES G. CAMERON,
 JOHN ALLEN.